(12) United States Patent
Marple et al.

(10) Patent No.: US 7,877,259 B2
(45) Date of Patent: Jan. 25, 2011

(54) PROSODIC SPEECH TEXT CODES AND THEIR USE IN COMPUTERIZED SPEECH SYSTEMS

(75) Inventors: Gary Marple, Boxborough, MA (US); Sue Ann Park, Newtown Square, PA (US); H. Donald Wilson, White Plains, NY (US); Mary Louise B. Wilson, legal representative, Bowie, MD (US); Nancy Krebs, Severn, MD (US); Diane Gaary, Ardmore, PA (US); Barry Kur, State College, PA (US)

(73) Assignee: Lessac Technologies, Inc., Boxborough, MA (US)

( * ) Notice: Subject to any disclaimer, the term of this patent is extended or adjusted under 35 U.S.C. 154(b) by 927 days.

(21) Appl. No.: 11/547,369

(22) PCT Filed: Mar. 7, 2005

(86) PCT No.: PCT/US2005/007232

§ 371 (c)(1),
(2), (4) Date: Mar. 9, 2007

(87) PCT Pub. No.: WO2005/088606

PCT Pub. Date: Sep. 22, 2005

(65) Prior Publication Data

US 2007/0260461 A1 Nov. 8, 2007

Related U.S. Application Data

(60) Provisional application No. 60/550,921, filed on Mar. 5, 2004.

(51) Int. Cl.
*G10L 13/08* (2006.01)

(52) U.S. Cl. ..................................................... 704/260
(58) Field of Classification Search .................. 704/260
See application file for complete search history.

(56) References Cited

U.S. PATENT DOCUMENTS 5,748,838 A 5/1998 Stevens (Continued)

FOREIGN PATENT DOCUMENTS

JP H08-77152 8/1994

(Continued)

OTHER PUBLICATIONS

"Standard and Customized Thermal Sensors Delivered . . . etc. Products—New Freeze..", www.americanthermal.com, 2005 American Thermal Instruments, Inc., (downloaded Oct. 2, 2006).

(Continued)

*Primary Examiner*—Susan McFadden
(74) *Attorney, Agent, or Firm*—K&L Gates LLP

(57) ABSTRACT

A method of, and system for, acoustically coding text for use in the synthesis of speech from the text. The method includes marking the text to be spoken with one or more graphic symbols to indicate to a speaker a desired prosody to impart to the spoken text. The markups can include grapheme-phoneme pairs each wherein a visible prosodic-indicating grapheme is employed with written text and a corresponding digital phoneme is functional in the digital domain. The invention is useful in the generation of appealing, humanized machine speech for a wide range of applications, including voice mail systems, electronically enabled appliances, automobiles, computers, robotic assistants, games and the like, in spoken books and magazines, drama and other entertainment.

20 Claims, 6 Drawing Sheets

U.S. PATENT DOCUMENTS

| | | | |
|---|---|---|---|
| 6,470,316 B1 * | 10/2002 | Chihara | 704/260 |
| 6,477,495 B1 * | 11/2002 | Nukaga et al. | 704/260 |
| 6,483,019 B1 | 11/2002 | Hamilton | |
| 6,847,931 B2 | 1/2005 | Addison et al. | |
| 6,865,533 B2 | 3/2005 | Addison et al. | |
| 7,240,010 B2 * | 7/2007 | Papadimitriou et al. | 704/275 |
| 7,472,065 B2 * | 12/2008 | Aaron et al. | 704/258 |
| 2003/0163316 A1 | 8/2003 | Addison et al. | |

FOREIGN PATENT DOCUMENTS

| | | |
|---|---|---|
| JP | H11-338498 | 5/1998 |
| JP | 2002-525663 | 3/2001 |
| JP | 2003-208191 | 1/2002 |
| WO | WO/03/065349 | 8/2003 |

OTHER PUBLICATIONS

International Search Report for PCT/US2005/007232, dated Jul. 14, 2005.

Written Opinion of the International Searching Authority for PCT/US2005/007232, dated Jul. 14, 2005.

M. Prendergast McLean, "Good American Speech", E.P. Dutton and Company, Inc., New York, 1952, pp. 45-49 and 239-255.

* cited by examiner $12 \rightarrow$ #21, #3, +y, $N^2$, R, 'N³, N³ₙ, $N^1$, $N^1_n$
$10 \rightarrow$ H'Lo Calls, & aWAY, unTil, unEARTH, aGAIN, & It's GOOD

Fig. 1

Level sustention 2b upglide 20  ⌒  circumflex 24a  ⌒ downglide 22  ⌒  circumflex 24b  ⌒

Fig. 2 sk, sm, sn, sp, spr, spl, st, str, sw:   36 hw
whiskey, husky; dismantle, dismay; ensnare, unsnarl transport conspire; improvident, suppress; display, implode distinct, constant; constrain, instruct; unswept, bittersweet

↑
42

Fig. 3 tingling, wrangler, longevity; ink, thank, pinker

| | | |
|---|---|---|
| DS (DZ); DG (DZH): | heads back, heads south; | bridge toll, edge slowly |
| TS | CH (TSH): | beats fast, beats softly; church bell, each shore |

Fig. 10

| | | Play and Link | Prepare and Link | Direct Link |
|---|---|---|---|---|
| Ex. 1 | (ds) | heads back | heads south | heads up |
| Ex. 2 | (ds) | heads back | heads south | heads up |
| Ex. 1 | (ts) | beats fast | beats softly | beats up |
| Ex. 2 | (ts) | beats fast | beats softly | beats up |
| Ex. 1 | (dzh) | bridge toll | edge slowly | edge away |
| Ex. 2 | (dzh) | bridge toll | edge slowly | edge away |
| Ex. 1 | (tsh) | church bell | each shore | each other |
| Ex. 2 | (dl) | church bell | each shore | each other |
| Ex. 1 | (tsh) | watch me | watch shane | watch over |
| Ex. 2 | (tsh) | watch me | watch shane | watch over |
| Ex. 1 | (dl) | middle school | middle life | middle office |
| Ex. 2 | (dl) | middle school | middle life | middle office |
| Ex. 1 | (tl) | little mistakes | battle lines | little error |
| Ex. 2 | (tl) | little mistakes | battle lines | little error |

DL: middle school, waddle forward, mantle ledge; middle life, idle life

TL: little mistakes, metal bars, battle game; battle lines, an idle life

Fig. 6 single, wrinkle, trouble, people

Fig. 7 see it, sea all, deny everything, way off, destroy all, seeing, paying, destroying, defying serious, create, materialize, real, deteriorate do it, ru in, cruel; go away; bow out

Fig. 8

| | |
|---|---|
| Direct Link: | please order, get all of it |
| Play and Link: | Send back, single dancer, |
| Prepare and link: | Don't tell, a bad tooth, a good thing Some milk, save face, |

GETTYSBURG ADDRESS
REPORTORIAL STYLE

Fourscore and seven years ago our fathers brought forth on this continent, a new nation, conceived in Liberty, and dedicated to the proposition that all men are created equal.

Now we are engaged in a great civil war, testing whether that nation, or any nation so conceived and so dedicated, can long endure. We are met on a great

PROSODIC SPEECH TEXT CODES AND THEIR USE IN COMPUTERIZED SPEECH SYSTEMS

CROSS-REFERENCE TO A RELATED APPLICATION

The present application claims the benefit of commonly owned Marple et al. U.S. provisional patent application No. 60/550,921 filed Mar. 5, 2004 the disclosure of which is hereby incorporated herein in its entirety by this specific reference thereto.

STATEMENT REGARDING FEDERALLY SPONSORED RESEARCH OR DEVELOPMENT (Not applicable.)

BACKGROUND OF THE INVENTION

The present invention relates to methods and computerized systems for providing synthesized or artificial speech, typically from a text input, employing novel prosodic speech text codes.

Synthesized, artificial or machine speech has many useful applications, for example, in voice mail systems, electronically enabled appliances, automobiles, computers, robotic assistants, games and the like, in spoken books and magazines, drama and other entertainment. The present invention extends to implementation in any such systems, as will be apparent from the disclosure hereinbelow.

Useful known systems for generating artificial speech are generally described as concatenated systems or formant systems. Concatenated artificial speech systems may be used for example in interactive voice mail systems and employ prerecorded complete phrases or sentences to yield a tolerably human, speech sound. However such systems are not suitable for the conversion to speech of extensive tracts of unknown text such as magazine articles or books. Formant systems which synthesize small slices of vocal or voice-like sounds "on the fly" as the text is machine read or otherwise processed by the computerized system, are more suitable for such larger tracts. However, until recently the output of such formant speech systems was notoriously mechanical, monotonous or machine-like.

Stevens U.S. Pat. No. 5,748,838 assigned to Sensimetrics Corporation (Cambridge, Mass.) discloses a speech synthesizing method which uses glottal modeling to determine and transform ten or fewer high level parameters into thirty-nine low level parameters using mapping relations. These parameters are inputted to a speech synthesizer to enable speech to be synthesized more simply than with prior art systems that required 50 to 60 parameters to be inputted to represent any particular speech. While the Stevens disclosure may be useful for its intended purposes, the somewhat mechanistic modeling of the vocal anatomy employed by Stevens, does not yield a speech output having appealing humanistic qualities. Nor does Stevens provide or suggest a means for adding desirable prosody or of controlling and modifying the prosody of synthetically or artificially generated speech.

As described in commonly owned Addison et al. U.S. Pat. No. 6,847,931, copending U.S. patent application Ser. No. 10/334,658, ("Addison '658") and international patent publication number WO/2003/065349 text to be synthesized may be marked up with speech training notations as a pronunciation guide for intelligibility. Addison '658 provides for expressive parsing in speech synthesis and employs trained speakers to generate speech element databases that can be utilized to implement expressive synthesis of speech from text. Neither the Lessac system nor other known systems provides a simple method for communicating desired prosody to a speech synthesizer in a manner that permits control of the prosody of the output speech.

*Good American Speech* by Margaret Prendergast McLean E.P. Dutton & Co., Inc. (1952) "McLean" hereinafter, describes a system of notations for marking text to instruct the reader as to desired intonation patterns, or changes of pitch during connected speech, that should be adopted to avoid faults such as monotony or peculiar or dialectical intonation. This work preceded modern attempts to computerize speech and nothing in the art suggests any usefulness of the McLean intonation patterns to solve present-day problems in synthesizing speech. Furthermore, McLean's intonation patterns lack any means of referencing pitch, making it difficult for different speakers to utilize the intonation patterns in a consistent manner.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

Accordingly there is a need for a simple method for communicating desired prosody to a speech synthesizer in a manner that permits control of the prosody of the output speech.

To meet this or other objects, the invention provides a method of acoustically coding text for use in the synthesis of speech from the text, the method comprising marking the text to be spoken with one or more graphic symbols to indicate to a speaker a desired prosody to impart to the spoken text.

The invention also provides a method and system of speech synthesis which includes prosodic codes, or notations, for marking up text with expressive meaning to specify an appropriate prosody. The markups can comprise grapheme-phoneme pairs each comprising a visible prosodic-indicating grapheme employable with written text and a corresponding digital phoneme functional in the digital domain.

The prosody to impart can comprises one or more prosody elements selected from the group consisting of pace, intonation pattern, rhythm, musicality, amplitude, pauses for emphasis and breath, and formal and informal articulations of words and phrases.

The method can comprise marking visible text with graphic prosody symbols or electronically marking electronic text with electronic versions of the graphic symbols, the electronically marked text being displayable or printable as human-readable graphically marked text.

In another aspect, the invention provides a speech synthesizer controlled by acoustic coding variables input to the speech synthesizer, the acoustic coding variables corresponding to prosodic specifications employed to generate recorded human speech having a desired prosodic pronunciation to provide a synthesized speech output embodying the desired prosodic pronunciation.

Pursuant to one embodiment of the present invention, a novel notation system for phonetics, structure, and designation of playable and non-playable consonants, as is described hereinbelow as well as of what are known as the four "Lessac" neutrals is provided and their use yields a novel graphically marked-up text to be synthesized.

In addition, the present invention provides novel procedures and systems useful in text-to-speech (sometimes rendered as "TTS" herein) speech or voice recognition applications which procedures comprise one or more or all of the following steps:

generation of prosodic speech rules and their application in speech synthesis;
acoustic demonstration of prosodic speech rules;
an acoustic database library of prosodic speech elements;
exemplary software for TTS; and
TTS listener testing.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which:

FIG. 1 is a view of a number of words and phrases marked up with the Lessac pronunciation notation for structural NRG vowels;

FIG. 2 shows a sample of prosodic graphical symbols useful for indicating desired pitch changes in text, for example a continuous tonal pitch change pattern within a prosodic intonation pattern related to the text, pursuant to an embodiment of the invention;

FIG. 3 shows a sample of prosodic graphical symbols useful for indicating desired pronunciations of consonants in consonant s-blends pursuant to an embodiment of the invention;

FIG. 4 shows a sample of prosodic graphical symbols useful for indicating desired pronunciations of consonants comprising an "oboe" followed by a "percussive" consonant blends pursuant to an embodiment of the invention;

FIG. 5 shows a sample of prosodic graphical symbols useful for indicating desired pronunciations of percussive consonant combinations comprising "cymbals";

FIG. 6 shows a sample of prosodic graphical symbols useful for indicating desired pronunciations of consonant combinations comprising "woodblock clicks";

FIG. 7 shows a sample of prosodic graphical symbols useful for indicating desired pronunciations of consonant combinations comprising a neutral vowel between consonants;

FIG. 8 shows a sample of prosodic graphical symbols useful for indicating desired pronunciations of consonant combinations comprising Y and W connectives;

FIG. 9 shows a sampling of prosodic graphical symbols useful for indicating desired pronunciations based on the articulatory considerations of linking words in sequence, in this case short phrases;

FIG. 10 illustrates the use of two examples of prosodic graphical notation according to the invention with word stress and intonation pattern for a specified prosody, in this case "reportorial" prosody;

FIG. 11 illustrates one sample of markup employing both the Lessac pronunciation notation and the prosodic graphical notation illustrated in FIGS. 2-10, in a reportorial style;

DETAILED DESCRIPTION OF THE INVENTION

Figure 12:
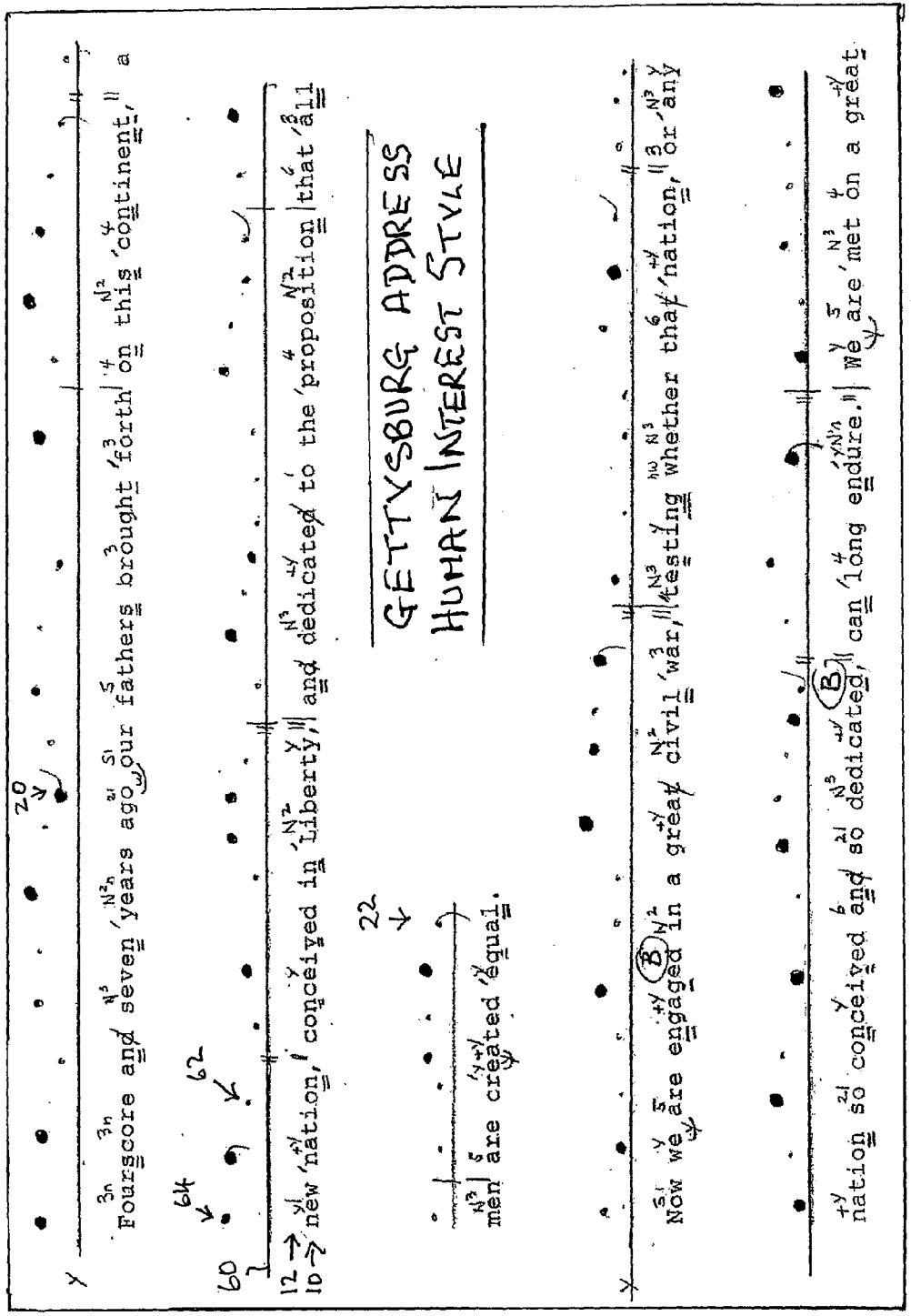
FIG. 12 illustrates another sample of markup employing both the Lessac pronunciation notation and the prosodic graphical notation illustrated in FIGS. 2-10, this sample being in human interest style.

Prior to the present invention, there was no known synthesizer "code" for specifying the sounds, nor any measured set of sound representations that the code should cause to create. Accordingly, the invention provides for skilled speech practitioners to become as it were, the "synthesizers" and to pronounce a sampling of prosodically marked-up text to enable acoustic values for desired pronunciations to be obtained. These acoustic values are employed to prepare a novel prosodic acoustic database library which can be used in speech synthesis, pursuant to the invention. Employing the novel graphical markup symbols described herein along with the controlled database recording methods described, useful prosody elements such as intonation pattern; rhythm; pauses for emphasis and breath; plus formal and informal articulations of words and phrases may be beneficially incorporated into synthetic or artificial speech.

To improve the unattractive mechanistic quality typical of much known synthesized speech output, the invention provides systems, methods and a novel text coding technique that provide controlled or standardized human speech inputs which are used to generate a database of acoustic elements that can be machine assembled into speech employing a rules set adapted to employ appropriate acoustic elements to provide a humanized speech output.

The human speech inputs and the rules set desirably embody the teachings of one or more professional speech practitioners. In one embodiment of the invention the teachings of a recognized speech training instructor are employed.

The teachings of Arthur Lessac for the dramatic arts and public speaking will be referenced herein, by way of example, with the understanding that the teachings of other speech training instructors or other bodies of speech training may be employed, and in particular, languages other than English will in many cases employ quite different speech training teachings. Desirably, such other speech training techniques may have a rules set that provides a consistent, easily understood speech output with an appealing prosodic character, as will be apparent from the teachings herein, for example a musical character. A speech practitioner can be understood to be an individual well schooled in a relevant speech training or coaching discipline who typically employs their speech skills and knowledge professionally, in a speaking capacity, for example as a speech teacher, a public speaker or an actor.

Speech practitioners trained in the Lessac method learn to think of speech as orchestrated sound, i.e. to think that speech is music. The text identifies the phonetic parameters of speech as the interplay of three elements described in Arthur Lessac's book, "*The Use And Training Of The Human Voice*", Mayfield Publishing Company, $3^{rd}$ ed. (1997) (referenced "Arthur Lessac's book" hereinafter) in Part Two, beginning on page 61. The three phonetic speech parameters identified by Lessac are consonant, tonal, and structural energies. These are introduced as the consonant "orchestra," tonality as the music of the voice itself, and structural energies as the interplay of structural elements on consonants and vowels. Arthur Lessac refers to the three phonetic speech parameters as vocal eNeRGy. Lessac notes that they all derive from the text to be pronounced, implying that factors such as the content of the text considered as a whole, the meanings and sounds of the words, their grammatical relationships, the syntax employed and the message to be conveyed by the text.

While human speech is analog sound and a speaker can "play the voice as a continuous instrument" it is useful to take discrete points in the continuum to teach the concept of infinitely variable expressive speech which is described particularly at pages 149, and 170 through 173, of Arthur Lessac's book, which text illustrates "point" values in continuous structural and tonal ranges.

The Lessac system provides more or less alphanumeric notations to code for desired pronunciations for intelligibility of individual speech elements, notably phonemes, diphones and what are called M-ary phones. These speech elements are primarily individual vowels and consonants, diphthongs and consonant blends.

Referring now to FIG. 1, the marked-up text comprises a text row 10 of words marked up for pronunciation according to the Lessac notation with a notation row 12 of alphanumeric symbols positioned directly above text row 10. Individuals familiar with the Lessac system for example as described in Arthur Lessac's book will be able to understand the pronunciation instructions indicated by the notations in row 12 and will be able to apply them to pronounce the text in row 10 in a consistent manner from one individual to another. Samples of such notations, which may be employed in the practice of the invention, are shown in Tables A-E, below. The result, if the text is well marked and the speaker properly implements the markup instructions, should be clear and intelligible speech. However, while clear and intelligible, the speech may, depending upon the speaker or speech source may be somewhat monotonous or machine-like.

TABLE A

STRUCTURAL NRG VOWELS

| Notation | Letters | Examples |
|---|---|---|
| #1 | oo, ou, oe | pool, soup, shoe |
| y1 | u, ue, eu, ew, ieu | Tuesday, neutral, lieu, assume, stupid, duty consume, costume, duel, nude, allude, enthusiasm |
| #21 | | rote, doe, road, romantic |
| #3 | aw, au, all, or, our alk | law, caught, call, caller, born, walker, balk |
| #3y | oy, oi | oy, enjoy, coin, moisture |
| R Derivative | er, ir, ur, yr, & wor | fern, dirt, burn, myrtle, work |
| #4 | o, & [a] when preceded by [w]- | hot, offer, foreign, borrow, collar wash, want, wander, watch, warp |
| #5 | [ar] and [ar + a consonant} except words spelled with {alm} | far, farm, large, darling, embark calm, balmy, psalm, palm, qualm, |
| #51 | ow, ou | down, ounce, mouse, crown, allow, renown |
| #6 | a | add, ask, canned, demand, ransack |
| #6y | i, ai, ei, ie, y | high, aisle, tied, sky |

TABLE B

TONAL NRG VOWELS

| Notation | Letters | Examples |
|---|---|---|
| Ybuzz | ee, ea, ei, ie {i} (before an oboe), and {y} when final | mete, succeed, lead, receive, vary, varies, think, sing, distinct |
| +Ybuzz | {a, ay, ey, ei, ai}, & {e} (before an Oboe) | late, say, obey, weigh, maid, strength, length, |

TABLE C

NEUTRAL VOWELS

| Notation | Letters | Examples |
|---|---|---|
| $N^1$ | u, o, oo, ou | full, wolves, good, could, coupon |
| $N^2$ | i, ui, y | pin, infinite; build, guilt; myth, sympathy, |
| $N^3$ | e, ea, a | pen, cemetery; deaf, measure; any, many, secretary |
| $N^4$ | u, o, ou; some oe, oo | much, uncle, succumb; once, done, above; rough, country, enough; does, blood |

TABLE D

NEUTRAL DIPHTONGS

| Notation | Letters | Examples |
|---|---|---|
| $N^1$n | oor, our, ure, ur | boor, poor, mooring; dour, tour, your; sure, pure, mural |
| y$N^1$n | ure | cure, during, endure, furious, lure,, inure,, liqueur, |
| $N^2$n | eer, ear, ier, ere | beer, deer, peer; dear, eerie, fear; here, mere; pier, tier |
| $N^3$n | air, are, ear, ere | fair, hairy, lair, pair; dare, pare, barely; pear, wearing, where, tear |
| #3n | ore, our, oor, oar | bore, chore, before; four, pouring; boar, roar, soaring |

TABLE E

CONSONANT GROUPS

| | |
|---|---|
| Strings | N violin |
| | M viola |
| | V cello |
| | Z bass fiddle |
| Woodwinds | L saxophone |
| | NG oboe |
| | TH clarinet |
| | W flute |
| | ZH bassoon |
| Brass | R trombone |
| | Y French horn |
| Sound effects (voiceless) | F, S, th, SH |
| Drumbeats | B, D, G tympani |
| | P bass drum |
| | T snare drum |
| | K tom-tom |
| Cymbals | DS (DZ); DG (DZH) |
| | TS CH (TSH) |
| Woodblock clicks | DL, TL |

The usefulness of the Lessac graphic notation for indicating intelligible pronunciation is described in Addison et al. U.S. patent application Ser. No. 10/334,658 filed Dec. 31, 2002 entitled "TEXT TO SPEECH", but no example is given and the particular embodiment of markup shown in FIG. 1 is not described.

Referring now to FIG. 2 the graphical symbols shown are useful pursuant to the invention, to indicate the pitch control required in the pronunciation of a letter, diphthong, syllable or other speech element to obtain a desired prosody in a spoken passage.

The prosodic codes employed in the invention are pronunciation codes that relate to the sequence of the text, to the sequence of the letters within a word; the sequence of words within a sentence; the intrinsic sequence of a sentence; the sequential location of the sentence in a paragraph; and the position of the paragraph as a part of a sequence of paragraphs. Any one or more of these considerations may determine what is, or is not, an appropriate prosody, or what prosodic element of stress, pitch or timing it is appropriate to apply to the text. Sometimes, the appropriate prosody will not be apparent until a sequence has been completed. The invention enables appropriate prosody to be applied to the text taking into account these considerations. The codes employed in the invention are determined by articulatory sound production principles and the context within which they are modified for expressive meaning by specifying an appropriate prosody.

Illustrated are an upglide 20, a downglide 22, two circumflexes 24A and 24B and a level sustention 26. Each graphical notation 20-26 comprises a left hand dot such as dot 28, indicating starting pitch and a tail such as upward tail 30 extending to the right of dot 28.

The contour of tail 30 indicates how pitch is to change as the speech element is enunciated. Upward tail 30 of upglide 20 indicates a rising pitch. Downglide 22 has a downturned tail 32 to indicate descending pitch and level sustention 26 remains level to indicate a sustained, unchanged pitch. Circumflex 24A indicates a pitch which rises to a peak and then descends, while circumflex 24B indicates the opposite. Prosodic graphical symbols 20-26 can be placed in any convenient location adjacent to text to be spoken, for example as coordinated in a row directly above the text, or selectively beneath the text. While the text could be broken with text or hyphens as an adjunct to the graphical pronunciation symbols describe herein, it is preferred to maintain the normal typed, keyed or written appearance of the text.

In subsequent figures to be described hereinbelow, (FIG. 5 onwards), a forward slash 36 through a letter is employed to indicate that the letter is only partially sounded, "prepared", because the following consonant has a closely related or identical sound. Also, a shallow U-shaped linking symbol having the form of a hammock strung beneath and between the linked letters and referenced 40 herein, is employed to indicate that letters which are separated from each other by other letters, and typically are in adjacent words should be pronounced in a continuous manner of connected articulations. The use of linking symbol 40 to mark a direct link is described in more detail below in connection with FIG. 9.

In general, pursuant to one embodiment of the invention, when marking up consonants, consonants before a vowel are spoken but are not "playable" because they are formed only briefly as the speech flows directly into the vowel. In this context "playable" means that the speaker can create a desired prosodic effect when enunciating the playable consonant, employing a dwell, pause or pitch change as the playable consonant is enunciated.

In this embodiment, silent consonants are not marked graphically, but are left to the computer software. Final consonants before a pause for breath or interpretation are marked playable. R trombone is not playable and is not marked before any other consonant or, when final, before a pause for breath or interpretation. This feature can also be one which the computer is programmed to understand.

Referring now to FIG. 3 the illustrated embodiment of prosodic graphical symbols includes the following markings for consonants:

a single underline to mark as playable percussives e.g. tympani drumbeats, D, B and G and snare, bass and tom-tom drumbeats, T, P and K, respectively;

a double underline to mark as playable strings N, M, V and Z; woodwinds, L, NG, TH and ZH; and (voiceless) sound effects F, S, SH and th.

Unmarked consonants are not playable which is to say that they are not a focus of attention to create a desired prosodic effect with a dwell, pause or pitch change as they are enunciated.

Additional rules, for prosodic graphical notation pursuant to the invention that may be employed for consonant blends include that the first letter of a consonant blend that begins a word is not marked. Consonant blends within words can be marked as follows:

| | |
|---|---|
| bl, br: | nobly, probably; abrasion, upbraid; / |
| cl, cr, chr: | unclean, include; increase; unchristian; |
| dr: | sundry, hundred |
| fl, fr, phr: | inflame, infraction, rephrase |
| gl, gr: | deglaze, English; degrade, aggressive; |
| pl, pr: | apply, replace; comprise, surprise; |
| qu: | inquest, unquiet, sequel; |
| tr: | restroom, distress, entrance; |
| thr: | bathroom, enthrall; |

In the exemplary embodiment of graphical notation useful in the practice of the invention which is illustrated in FIGS. 2-10, letters or letter combinations and diphthongs described above as strings (N, M, V and Z), woodwinds (L, NG, TH and ZH) and (voiceless) sound effects (F, S, th and ZH) are marked "playable" by a double underline when they appear before all other consonants unless the following consonant is an identical consonant or a cognate. When an identical consonant or a cognate follows, the first consonant is marked as "prepared" with a forward slash through the consonant.

Desirably, the letters NG can be underlined twice when the G does not represent an oboe followed by a drumbeat. When the part of the word ending in the letters NG has a meaning in common with the whole word, there is considered to be no drumbeat after the oboe letter, as in the following example:

long, singsong, longhand

FIG. 3 shows which of the consonants in an s-blend of consonants occurring in various words is playable, which is to say can be given an extended or emphasized pronunciation, or musical sounding, to enhance the prosody. For example, in "whiskey" and "husky" the S is to be played but the K is not played. The K is not silent: it is merely sounded quickly without pausing or dwelling on it. In "ensnare", the first N and the S are played but the second N and the R are not. A double underline with a "tail" 34 beneath the N of distinct followed by single underlines for C and T indicates the playable N may be played as an oboe but is followed by a drum beat consonant that must be played, in this case, a double drum beat consonant pair. A forward slash 36 with a bulb 38 on the upper end marked through the T of "dismantle" indicates the TL cannot be played as a "woodblock click" but as a consonant T followed by a playable consonant L as noted by the double underline for L.

As is shown in FIG. 4, when the NG represents an oboe plus a drumbeat or other percussive, the N can be under-lined twice with a tail 42 indicating that the N is playable as an oboe, but the G is underlined once to show that it is required to be played as a G tympani drumbeat percussive for the word to be articulated correctly. Also in FIG. 4, the word longevity is marked with the double underline and tail for the N followed by a G without an underline, indicating the N is playable as an oboe, but the G must be articulated as an "other percussive" cymbal DG for the word to be articulated correctly.

Drumbeats can be marked as playable, with a single underline, before consonants unrelated to the drumbeat, being consonants made and felt at a different contact position of the tongue with the oral anatomy. Before identical, cognate, or semi-related consonants, being consonants made in what feels like almost the same position, drumbeats usefully can be marked as "prepared" with a forward slash through the consonant.

Referring now to FIG. 5, cymbals are marked as "playable" with a single underline beneath each letter of the cymbal before all other consonants except identicals and cognates. Thus, for example, DS in "heads" is playable in "heads back" but not in "heads south". In FIG. 5, direct links are marked with a linking symbol 40, as described above. Thus, the DS in "heads back" is shown with a linking symbol 40 linking to the B and the TS in "beats fast" is shown with a linking symbol 40 linking to the F.

Referring now to FIG. 6, woodblock clicks DL and TL are marked as "playable", with a double underline, before all other consonants with the exception of a following initial L, because of the L in the woodblock click. Thus, for example, DL in "middle" is playable in "middle school" but not in "middle life". Hammocks 40 are marked to indicate direct links, as described above. The "o" marked at the top of the forward slash 36 indicates a special version of the "prepare" marking, used only for woodblock clicks, indicating that the consonant is to be prepared and linked to the L. In the case of the following L, the L is directly linked to the following L and therefore the end of the woodblock click may not be played as a sustainable consonant L.

Referring to FIG. 7, it is to be noted that it is desirable that consonant combinations of GL, KL, BL and PL NOT be treated as representing a woodblock clicks because there is a neutral (unwritten) vowel spoken between them. Thus, as shown, the L is playable, but the preceding consonant is not.

Desirably, W, H, and Y, are not marked as playable when the occur in what would be playable positions for other consonant instruments, because they are part of a vowel or diphthong, as is shown in the following examples:

new, newly, bow; bowline; cow, cowlick.

A useful notation for W and H together in the common combination WH, pursuant to the invention, is to mark the letters "hw" over the WH to indicate that H should be sounded first, followed by W, and that neither should be played.

Referring to FIG. 8, when a [Y] or a [W] occurs before another vowel, within words and between words, Y and W connectives 50 and 52 are created to indicate that speech continuity should be maintained from one word to the next or from one syllable to the next. The exemplary symbols employed for Y and W connectives 50 and 52, in this embodiment of the invention, each comprise a hammock-like shallow-U looping from beneath the Y or the W respectively to the following vowel, together with a small Y or W letter marked in, near or through the U. The U indicates the continuity to be maintained and a the letter Y or W indicates the sound to be employed, whether or not the letter is present in the written text input. For example, a Y is sounded between the E and the A of "create" and a W is sounded between the U and E of "cruel".

Referring now to FIG. 9, as described in Addison et al. copending patent application Ser. No. 10/334,658 and in more detail in Arthur Lessac's book, the Lessac system identifies a number of the ways that a consonant and one or more additional letters or phonemes in a word or phrase are to be linked as they are spoken. FIG. 9 shows some examples of how desired pronunciations of such linked words may be graphically indicated, pursuant to the invention.

Three examples of spoken word linking that are utilized in the Lessac speech system are addressed in FIG. 9, namely what are called "direct link", "play-and-link" and "prepare-and-link".

In a direct link a final consonant of one word is linked directly to a vowel at the beginning of the next word, for example, "far above" is pronounced as one word, "farabove".

In a "play-and-link", where there are two adjacent consonants made in different places in the mouth, such as a "k" followed by a "t", the first, in this case the "k", is fully 'played' (pronounced or sounded), meaning completed, before moving on to the second consonant, in this case the "t".

A prepare-and-link is used when there are two adjacent consonants made in the same place in the mouth, or in close proximity to one another, such as a "b" followed by another "b" or by a "p" as in the case of "grab boxes" or "keep back". In this case, the first consonant, or "drumbeat" is prepared, meaning not completed, before moving on to the second drumbeat, which is done with a slight hesitation.

The exemplary prosodic graphical notation adopted to indicate a direct link, as shown in the upper row of FIG. 9, comprises a linking symbol 40 strung beneath and between the linked letters, typically linking a letter or letters at or near the end of one word with a letter at or near the beginning of the next word, as may be clearly seen from the examples shown. The direct link indicates that the spoken momentum should be carried from one linked letter to the next without interruption or a pause or break between words.

In the play-and-link examples shown in the middle row of FIG. 9, the first consonant is played and the second consonant is not. Thus, a linking symbol 40 is combined with single or double underlining of the first consonant.

The prepare-and-link examples illustrated in the bottom row of FIG. 9 employ a forward slash through the first consonant which is to be prepared, combined with a linking symbol 40 to the second consonant to show the linkage. In addition, playable consonants are indicated with underlining, as described above.

Referring now to FIG. 10, of the two prosodic graphical symbols shown, Example 1 is relatively simpler and economical to implement while Example 2 is more sophisticated, designed to facilitate production of a high quality synthesized speech output suitable, without limitation, for applications such as spoken books and magazines, drama and other entertainment. Also, the more detailed notation of Example 2 reduces variations between speakers which may occur even when trained speakers are employed and thereby promotes consistency of output.

The Example 1 notation may, without limitation, be suitable for industrial applications such as for vocalized communication with appliances, vehicles, production machinery, low-end games and entertainment devices and so on. Of course, either notation may be used for other purposes, if desired.

In FIG. 10, Examples 1 and 2 are illustrated applied to the same text, on alternate lines, for side-by-side comparison. As may be seen by comparing the first two lines of the FIG. 10, one with the other, in the several combinations of "heads" with another linked word, an additional prepare marked by a forward slash 36 through the D of the DS combination provides a more subtle, more appealing sound. In each case continuity is maintained from "heads" to the following word, but in Example 2, because it is prepared, pursuant to the additional marking, the D is heard more distinctly. In pronunciations following Example 1, the D may get lost.

Referring now to FIGS. 11 and 12, it will be understood that the invention provides and employs a graphical symbol set which can be employed to indicate, or provide a template for attractive, prosodic speech output which has one or another quite distinct style. FIG. 11 shows a markup for a rendering of a portion of the Gettysburg Address in a "prosodic" style termed "reportorial" while the style shown in FIG. 12 is a more emotional human interest style.

The text of the Address is rendered in text lines such as text line 10 above which are marked with Lessac structural and tonal energy vowel pronunciation notations and with consonant energy pronunciation notations, including marking for percussive and sustainable tone consonants, woodblock clicks, and a linking symbol, as described above, in notation lines such as notation line 12. The text is also marked, beneath the text so as not to interfere with the pronunciation notations, with prosodic graphical symbols such as are described hereinabove, including individual letter underlines, upglides, downglides, hammocks and so. In addition what is called a Y-buzz line 60 is added above notation line 12 above which Y-buzz line 60 further prosodic symbols are marked. As described in Arthur Lessac's book, e.g. at pages 122 on, the Y-buzz is a vibratory foundation for bone-conducted tone in a speaker's or singer's voice.

A desired intonation pattern is marked in what may be termed as a prosodic pitch chart above Y-buzz line 60 using small dots 62 and large dots 64 at a level of the dot above the Y-buzz line 60 which is indicative of the desired pitch relative to the speaker's Y-buzz line pitch. The dot size can be employed to indicate desired stress, or relative amplitude for the designated relative pitch, with small dots 62 indicating no extra stress and large dots 64 indicating added stress is desired. Optionally, the dot size can indicate the desired degree of stress in a proportionate manner. While it may be possible to vocalize at frequencies below the Y-buzz line 60, tonal and articulatory control of the voice may become insufficient for the voice to perform as a controllable musical instrument.

Also marked in FIGS. 11 and 12 is a letter B in a circle which indicates errors made by speech practitioner B when pronouncing the text according to the markup. Errors are determined by other speech practitioners listening to a recording of the pronunciation and noting where the pronunciation departs from the markup to be followed. For example, in FIG. 12, practitioner B made two pronunciations different than were called for in the markup. The first was a failure to pronounce the drum beat consonant D at the end of the word "engaged" (text line 4, word 4). The second was a failure to perform the up-glide of E plus the drum beat for the consonant D at the end of the word "dedicated" (text line 5, word 5).

The added emotion and energy conveyed by the human interest markup shown in FIG. 12 is readily apparent by carefully comparing the prosodic pitch chart markings with those of the reportorial markup of FIG. 11. For example, many of the stress dots in FIG. 12 are larger dots 64 calling for greater stress or emphasis. Also, the upglide 20 above "ago" in line 1 is raised above the Y-buzz line 60 to indicate a desired higher pitch. In the lowermost line, the V of "conceived" is given an extra stress dot 64 and no circumflex 24B is employed. Other differences can be seen by inspection of the figures.

Figure 13:
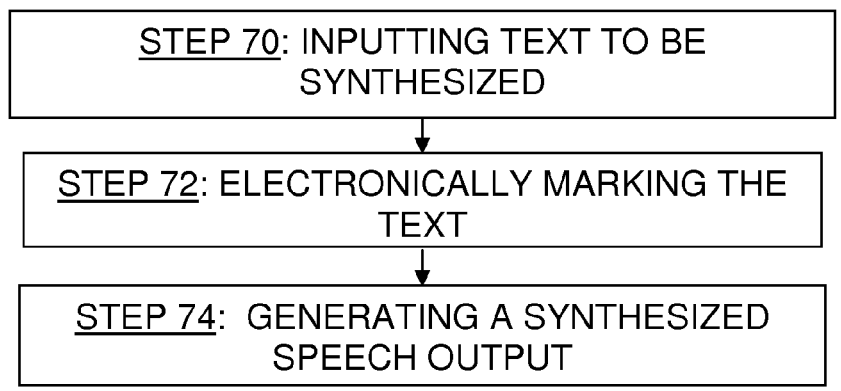
FIG. 13 illustrates a method of synthesizing speech from text according to an embodiment of the invention.

Referring to FIG. 13, the illustrated method of synthesizing speech from text includes a step 70 of inputting text to be synthesized to a computerized system. The method also includes a step 72 of electronically marking the text with electronic versions of one or more prosodic graphical symbols. The electronically marked text can be displayed or printed as human-readable text marked with the prosodic graphical symbols, if desired, to indicate to a speaker desired speech characteristics to be employed in speaking the text. The prosodic graphic symbols can comprise intelligibility pronunciation notations in sequence with the text and pitch change notations in sequence with the text. The method also includes a step 74 of generating a synthesized speech output comprising phonetic data corresponding with the marked up text and having the prosody indicated by the prosodic graphical symbols.

Figure 14:
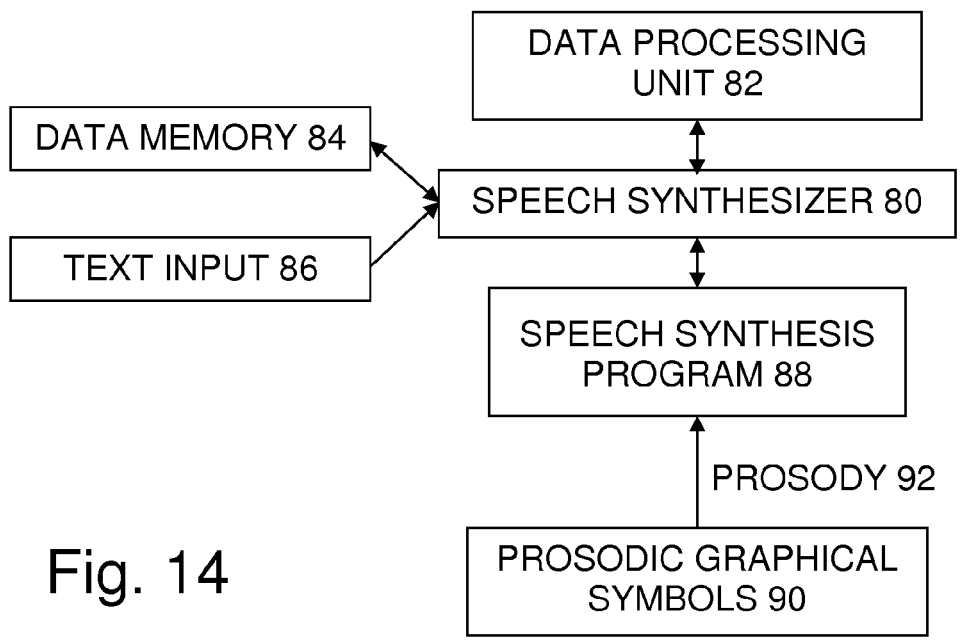
FIG. 14 illustrates a speech synthesizer according to an embodiment of the invention.

Referring to FIG. 14, the illustrated computerized speech synthesizer 80 comprises a data processing unit 82, data memory 84, a text input 86 for inputting text to be synthesized, and a speech synthesis program 88. Speech synthesizer 80 can perform a speech synthesis method such as is illustrated in FIG. 13 wherein prosodic graphical symbols 90 indicate a desired prosody 92 to the speech synthesizer.

It can be seen from FIGS. 2-10 and particularly from FIGS. 11 and 12 that the invention provides a comprehensive text markup system which can embody sophisticated pronunciation and prosodic symbols with ordinary text, as overlays that do not break up or interrupt the ordinary text to yield a novel instruction or control document providing a blueprint for accurate, comprehensible, appealing and even melodic rendering of the text as speech by human voice or machine.

Other suitable graphical symbols for marking up text for speech to achieve the objects of the invention will be apparent to those skilled in the art in light of the disclosure herein and are contemplated as being suitable for the practice of the invention. For example various geometric symbols or schemes of geometric symbols or animated graphemes may be employed. However, it is believed that simple symbols such as are described herein will be intuitively understood, easy to apply in marking up a script or other text and, importantly, can be readily comprehended by a trained speaker as they read the marked up text.

The prosodic graphical symbols shown in FIGS. 2-4 and other figures and as described herein may be utilized in various ways to promote a humanized sound in synthesized speech output, especially formant speech output. For example, the notations may be employed by one or more, preferably a plurality of persons trained to accurately pronounce text, according to the mark-up speech codes set forth herein, to produce databases of pronounced speech. Said databases would contain pronounced speech demonstrated to accurately follow text marked with the speech codes set forth herein. Alternatively, or in addition, the prosodic graphical symbols of the invention can be digitally rendered and be employed in synthesizer software for electronic markup of text to be machine spoken to facilitate or guide the introduction in the digital domain of prosodic elements into the output speech. The databases of recorded speech corresponding to the graphical notations for letters, words, phrases, sentences, paragraphs and longer texts, can be digitized and analyzed to arrive at algorithms and other metrics for specifying the unique relationship of specific phonetic data corresponding to the specific text with its related graphical notations. This can then be used to provide input parameters to a synthesizer to re-create sounds that imitate human speech for a particular text to be synthesized as speech with a specified prosody.

For simplicity, each text unit and its associated speech code graphical notations may be considered to be a "grapheme." Similarly, each acoustic unit that corresponding to a "grapheme," is identified as a "phoneme." An extended set of several hundred or several thousand, (where "several" means "at least two"), or more, grapheme-phoneme pairs of pronunciation associations for pitch, amplitude and the prosodic graphical notations of the invention can be digitally rendered and be employed in synthesizer software for electronic markup of text to be machine spoken to facilitate or guide the introduction into the digital domain of prosodic elements into the output speech.

Those skilled in the art will understand that the particular prosodic graphical symbols shown in FIGS. 2-4 are merely exemplary and that prosodic graphical symbols useful in the practice of the invention, pursuant to the teachings herein, may have many other forms. Furthermore, the particular examples of symbols shown are adapted for the Lessac speech system. If desired, other prosodic graphical symbols may be employed for implementing other speech coaching or training methods, or indeed for implementing the Lessac system to facilitate humanization of machine speech, pursuant to the invention, as may be understood by those skilled in the art in light of the teachings herein.

Pursuant to one embodiment of the invention, guidelines such as those described in the following paragraphs can be observed in preparing a prosodic markup such as those shown in FIGS. 11 and 12.

Preparation of Marked-Up Scripts. In preparing marked-up scripts to be spoken, such as those illustrated in FIGS. 11-12, good page layout is helpful to the speaker, facilitating their simultaneous comprehension not only of the text but of the added symbols provided, pursuant to the invention, to guide the speaker to a consistent attractive speech output which speech output can be useful in creating databases and otherwise useful in computerized speech synthesis.

Desirably, the text should be amply spaced for example with 3 cm or more above each line to accommodate the pronunciation notations and prosodic graphical symbols that are to be added. A relatively large font is useful to accommodate the various notations and symbols in a manner facilitating accurate reading and interpretation of the markings while speaking aloud. A font such as 14 point Lucida Bright Semi bold is an example of a suitable font.

In one embodiment of the invention in marking up the script, each line of script, including the last line on the page, is ended with a vertical mark for phrasing or breath. Numbers and are written out. Acronyms are written out in full if the is to be spoken as words rather than letters. Usefully, a reference dictionary for consistent pronunciation is designated, for example, Merriam Webster's Collegiate Dictionary, Tenth Edition.

Where the reference dictionary offers a choice of pronunciation, the first pronunciation given is used unless the recording is of formal or 'elevated' speech, in which case a 'contracted' pronunciation is used, if listed.

The intonation pattern is the general movement from pitch to pitch, in steps, during connected speech. Inflections are the sliding pitch changes on vowels or consonants either as what may be called an upglide, a level sustention, a downglide, or a circumflex glide.

Usefully, in this embodiment of script preparation, the speaker explores the script aloud to experience the intonations and inflections that convey the meaning of each sentence.

Double vertical lines are marked on the script to indicate breath pauses and single vertical lines are marked to indicate phrasing where there is no pause which will affect the handling of final consonants at these divisions.

In one useful embodiment of the invention, after these preparations, first the consonants are marked up, and then the vowels are marked up, for pronunciation and prosody as described hereinabove.

The next step is to draw the Y-buzz pitch line 60 closely above, but not obscuring, the vowels to provide a reference for the pitch markings. The pitch range being notated will be from low Y-buzz range (below the Y-buzz line 60) to mid-call range being where non-distorted vowels can be vocalized in mid-calls, for example #3, R, and +Y and optionally #4 and N Additional pitch lines (not shown) can be drawn above Y-buzz line 60, if desired for example a mid-low register line and a mid-mid register line. The intonation dots 62, 64, or other suitable markings can be placed both on the pitch lines and between them. Other methods may be used for providing a pitch range, if desired, for example, as described in Daniel Jones's book, *Outline of English Phonetics,* wherein a three-line staff is used to define a pitch range.

The speech system practitioner who, in order to practice the illustrated embodiments described herein should be a Lessac practitioner, then records what they perceive to be desired intonations and inflections according to the respective speech system and the desired prosody, using the Y-buzz line 60 as a guide for their own pitch range. As referenced above, a dot can be marked for every syllable, employing small, distinct dots such as 62 for unstressed syllables and noticeably larger dots 64 for stressed syllables.

For human interest recordings for example as illustrated in FIG. 12, a richer use of speech features such as what are known as "structural NRG" and "concentrated tone" in the Lessac system can be marked using larger dots with a circle around them, or other suitable graphic indication, to indicate call focus where desired on words containing the Lessac basic call words, without distortion of the vowels. The terms used in this paragraph relate to the Lessac speech or voice system and may be understood from Arthur Lessac's book.

For example, as described in that book, structural NRG is a kinesthetic vocal energy ("NRG" pursuant to Lessac) state that is related to facial posture and refers to the mold, shape and size of the vocal sound box. Structural NRG is considered to be related to the color, body warmth and esthetics of vocal tone.

Operative words can be marked with a double accent mark e.g. ", before the primary stressed syllable while a secondary stressed syllable can take a single accent mark, e.g. '.

In this context, an, operative word is a word in each successive phrase, or other sense-group division of the text, that introduces a new idea that carries the argument forward as the sentences progress.

Desirably, pursuant to this aspect of the invention, pursuant to which careful and consistent voice recordings can be made for use in a text-to-speech synthesis database, each "sense group" of words within the phrasing and breath pause divisions of the text has an identified operative word. Infrequently, there may be two operative words of comparable significance.

Using the vocal dynamics of Lessac training, the operative word can be identified in various ways, for example, by marking it to be spoken with a higher pitch, or by substantially lengthening its vowels and consonants, or by adding concentrated tone, call resonance, or by combinations of these dynamics.

In one exemplary embodiment of the invention, the introduction of an argument begins with a declarative sentence in which all but the connecting words are marked, or not marked, to have approximately the same amount of stress or emphasis. The first stressed word can be raised in pitch and the rest can descend by steps to the Y-buzz range with a downglide on the last stressed syllable.

By way of example, in a script marked up for speech pursuant to the invention, the various inflections can be used at punctuation marks as will now be described. Periods and semicolons can take a downglide 22 on the last stressed word. Commas and colons can take an upglide 20 or a level sustention 26. Questions beginning with a question word (e.g. who, what, where, when, how or why) take a downglide 22 on the last stressed word and other questions, typically ones expecting a "yes" or "no" answer, take an upglide on the last stressed word.

Other Speech Training Systems. the claimed invention can be implemented in embodiments employing rules or speech training principles or practices other than the Lessac methods, as will be understood by those of ordinary skill in the art. One such example is that of the methods of Kristin Linklater of Columbia University theater division. Information regarding Kristin Linklater's techniques and those of other speech practitioners in the field whose rules can be employed in the practice of the present invention, if desired, can be found at www.columbia.edu/cu/news/media/00/kLinklater/ and at www.kristinlinklater.com.

Prosodic speech rules and their application. The prosodic speech rules employable in the invention are intended to account for the articulations and co-articulations of a language and its various dialects. An exemplary program language which will be referenced herein is American English, General Education dialect. It will be understood that other languages may be employed. The prosodic speech rules, at least some of which may be derivable or known from the Lessac texts, are applied to text to be pronounced or synthesized using novel acoustic codes as described herein to enable a speaker familiar with the Lessac system to read the text aloud with appropriate, Lessac determined, controlled pronunciation.

Examples of rules include: the use of random pauses as described in one or more of the commonly owned applications, and as modified by breath pauses; the definition of prosodies incorporating rhythm, intonation pattern, word stress, word selection, and consonant "blends;" all to be derived directly from the text to be pronounced. These Prosodic speech rules can be adapted to other dialects and languages.

The acoustic markup codes employed in the invention can indicate how particular speech sounds may be produced, and what speech variables may be employed to produce those sounds. The text to be pronounced, along with optional specified value(s) for the variable(s) of each code, can serve as prosodic instructions for a human speaker who has been trained to follow the codes when pronouncing the text. Pursuant to the invention, identical or similar such code variables, or their machine equivalents, may be used to direct a computerized synthesizer to pronounce text according to prosodic instructions. The codes control the production of sound and the variables indicate a quantifiable identity relating to desired sound characteristics.

Examples of speech variables that may be coded pursuant to the method of the invention include: audible frequency, amplitude, pitch and duration of the sound element that is to be synthesized to express a particular phoneme or other speech element. Some examples of specific variables that may be quantified to desired values are: fundamental voice frequency; upper and lower values of controllable pitch range; pitch change expressed as a change in frequency per unit of time; amplitude change per unit of time; and combined amplitude and pitch change per unit of time.

An example of one useful relationship between a speech rule, an acoustic markup code and one or more variable value(s) will now be described. Other possibilities will be apparent to those skilled in the art. Breaks between words and the occurrence of a comma in a sentence both represent a pause in the creation of speech sounds. Nevertheless each type of pause has a different character which, pursuant to one embodiment of the invention can be indicated by different acoustic codes. Pauses are helpful to a listener, facilitating recognition of individual words and providing separations aiding the identification of phrases. Similarly, while each pause involves time as a variable, the time value, or duration, measured in milliseconds of the relative silence between sounds that commonly constitutes a pause, may be different in different contexts. Between words, where the written text has no comma, the pauses are part of the pace of speaking and may be determined by the overall speed and rhythmic variation of the speech as called for by the rhythmic sounds of the articulated words bounding each pause and contained within a complete phrase.

Thus, the pauses may be contextually determined by the prosody of the speech for example an excited, serious, reportorial, poetic, persuasive or other prosody, where a comma in the corresponding text indicates a separation of phrases, the corresponding pause duration or time during which there is no voicing, when the text is spoken, may be varied by the speaker according to the prosody and other factors. In natural human speech, this pause is not a single value, but has variations of greater or lesser lengths of time, sometimes to take a fresh breath, and other times to provide added emphasis, or to serve as point/counter point for the rhythm of the overall paragraph containing the sentence and its phrases. If in a machine speech rendering of the paragraph, the human speaker's varying pause durations were to be rendered as constant millisecond values, the resulting speech would likely be perceived as mechanical rather than human, because humans tend to vary the pause length between phrases.

Exemplary Script Markup Procedure.

To create a graphic symbol set and to provide acoustic data for accurate pronunciations that follow the rules to prepare an exemplary prosodic acoustic library, a team of four accredited Lessac Practitioners works with the 1,000 most frequently used words in American English and 500 phrases and sentences.

The Practitioners review and refine the prosodic speech rules employed. Desirably, they can develop mark-up instructions and notations for each of the rules. They can also develop notations for prosody.

The rules are then applied to sample words and sentences.

In one exemplary embodiment of a script markup procedure according to the invention, each speech practitioner marks the words and sentences in a script, formatted as described herein, for pronunciation according to the Prosodic speech rules. Usefully, the script can comprise at least about 1,000 words and 500 phrases broadly representative of the language of the text to be converted to speech. If desired, the words and phrases in the script may be confirmed to a specialist subset of the language, for example a medical, scientific, or regional dialect specialist subset. Each Practitioner's mark-up is then examined by another team member to identify errors in applying the Prosodic speech rules. A reconciled final mark-up of the 1,000 words and 500 phrases and sentences, without errors, is prepared.

Desirably, using the reconciled final mark-up, each practitioner recites a sampling of words and sentences from the marked-up script. One or more of the other practitioners listens to the pronunciations and notes any errors in following the prosodically marked-up text. This technique can be employed to rehearse one or more speakers prior to a recording session or other spoken presentation.

To prepare a recording useful in preparing an acoustic database for use in speech synthesis according to the invention, a script of words and sentences to be pronounced in a studio recording session is marked up with a baseline reportorial prosody, for example as shown in FIG. 11. Each practitioner receives a copy of a final reconciled mark-up of the reportorial script together with mark-ups of a subset of the same sentences with mark-ups for a second prosody.

For the recording session, the practitioners employ a studio with a "dry room" recording environment, desirably being one meeting precisely drawn criteria for analog-to-digital sampling rates and acoustic quality. In the studio session, an acoustic CD or other analog recording of each Practitioner's pronunciation is prepared, along with a data CD, or DVD, that captures the recorded pronunciations as WAV or other data files.

To assure the quality of the data, each practitioner's acoustic CD can be provided to another practitioner who listens to the pronunciations and notes, on a copy of the complete correct mark-up, any errors of pronunciation that failed to follow the mark-up. Desirably, where an error is noted, the pronunciation is excluded from the WAV database so that only correct articulations, intonations, and prosody elements are retained for the database.

By following such a markup, speaking and recording procedure, a relatively error-free digitized database library of speech elements can be provided which comprises phonemes, words, phrases and sentences of a language or language subset which conforms to the input pronunciation and prosody rules. Some consistency is possible whereby a speech element library prepared by one group of practitioners is comparable with a similar library prepared by another group of similarly trained practitioners.

Prosodic Acoustic Library. For prosodic speech rules to be effectively applied to computerized speech, the invention provides a graphic symbol set that uniquely connects each prosodic speech rule to the specific text to be pronounced and the corresponding phonetic data when correctly pronounced. A specific prosodic acoustic library is prepared for each language and the most widely used dialects. Each specific prosodic acoustic library is envisioned as containing: a comprehensive dictionary; Prosodic speech rules; graphic mark-up symbols representing the rules; exemplary phonetic data for pronunciations that correctly follow the rules, along with the text for those exemplary pronunciations. A comprehensive prosodic acoustic library for a specific language and dialect is the basis for deriving, and hence specifying, formant parameter values for articulations uniquely associated with the prosodic speech rules applied.

An exemplary prosodic acoustic library database pursuant to one embodiment of the invention includes:
 a) A selection of text words and sentences representative of the text to be synthesized to speech.
 b) A set of rules for computerized mark-up of the text for intelligible pronunciation. These may include consonant, vowel, co-articulation, and pause rules.
 c) Prosody rules for two prosodies, "Reportorial" and "Human Interest," as described herein. These prosodies are marked-up and pronounced and are included. These rules specify values that vary with time such as changes of pitch, volume, rhythm, speaking pace, and word stress.
 d) A copy of a reconciled manual mark-up of the prosodic speech rules applied to the text.
 e) Pronunciations of marked-up text. The four practitioners' WAV data files representing all the words and sentences pronounced in "Reportorial" prosody, plus examples of some sentences pronounced in "Human Interest" prosody.

Desirably, the exemplary prosodic acoustic library database structure includes WAV data, text, graphic, and numeric data. Exemplary software statements, source code modifications, and synthesizer specification values can also be added. One Exemplary prosodic acoustic library database can contain approximately 8 to 12 gigabytes of data. Commercially available off-the-shelf relational databases do not presently allow the combining of WAV data with text, graphic, audio CD, and numeric data. Accordingly, the invention can employ a temporary database structure to verify product design to combine WAV data with text, graphic, and numeric data. Exemplary software statements, source code modifications, and synthesizer specification values can be added. One Exemplary LAL database can contain approximately 8 to 12 gigabytes of data. If desired, the architecture for assembling, storing, and processing the database components can be refined in light of the results of using a temporary structure; which can be useful for assembling comprehensive database libraries containing text, graphic, acoustic, and numeric data.

Exemplary Software. Known speech synthesizers or synthesizer engines may comprise:
 text input means for example one or more data files, a scanner and associated software and hardware for making the text data available to the system in a suitable form;
 a data processing unit and associated data memory, to implement software and effect speech synthesis operations;
 speech synthesis software implementable by the data processing unit, which software may also be described as a software engine, for converting the text data to speech data and
 audible output means, for example an audio port capable of providing an audio signal to a loudspeaker or headphones, and associated hardware and software for outputting speech data received from the speech synthesis software, ultimately in audio form.

It will be understood that the speech may be stored, communicated or distributed as speech files, for example .wav files, if desired, for playing at a time or times subsequent to synthesis.

Conventionally, such known speech synthesizers have been developed to implement specific, limited sets of linguistic and synthesis rules and their output when assembled from small speech components such as phonemes, words or short phrases is notoriously machine-like and inhuman. The present invention, provides a novel speech synthesizer and speech synthesis software employing source code adapted to enable the implementation of additional, and/or alternative, linguistic rules to implement the teachings herein, employing the novel text-marking symbols and prosodic markups of the invention to provide an appealing, humanized speech output. Pursuant to the invention, the speech synthesis software can specify the acoustical output values of a suitable speech synthesizer producing the sounds corresponding to the pronunciation rules applied to the text as shown by the pronunciation notations and graphical symbols with which the text is marked up to determine the pronunciation and prosody of the output speech.

Exemplary Software. Suitable software for implementing the invention, adapted to the purposes of the invention as described herein, can be provided by one or more persons skilled in the art, for example an engineer and/or computer linguist, familiar with formant text-to-speech ("TTS") engine software. Suitable additional linguistic rules and synthesizer signal specifications can be added to known speech software engines to build and test software embodying or for implementing the invention. For example, a sample prosodic acoustic library database as described herein can be analyzed to isolate the pronunciation mark-up symbols of the invention and corresponding WAV data for co-articulations not presently specified in a known formant TTS synthesizer and the necessary elements can be added to the known synthesizer.

The resultant speech synthesis software program or programs can be useful, in addition to its uses for machine generation of appealing or even elegant speech from text, to help educate a software engineer or others in a pragmatic understanding of the Lessac or other speech training system implemented in the software, and or the novel prosodic speech rules employed. It can also identify items to be programmed to accommodate desired additional linguistics, phonetics, and prosody rules and novel acoustic signal parameters described herein.

Exemplary software can be written manually, programming the mark-ups to the text and specifying the associated phonetic values for the synthesizer's sound production. Once such a sample is done, larger dictionaries can be programmed automatically employing a computerized system that directly uses text to be synthesized as input and applies the rules required by that particular text in the context of the particular word, sentence, and phrase to specify hybrid formant and concatenated parameters and values. The formant parameter values are those required to yield the pronunciation and prosody specified in text markup, operating according to the specific pronunciation and/or prosody rule marked, and according to the voice identity characteristics, fundamental frequency, harmonics, etc. which are to be output.

Listener Testing. The invention contemplates employing listener testing of synthesized speech output pursuant to the invention to provide feedback for improving the product. Listeners can be polled for perceptions of improvements in clarity and message comprehension as well as for their determination as to whether the sample sounds better than a conventional comparative product, for example a Sensimetrics' HLSYN(trademark) or SENSYN(trademark) formant synthesizer. Desirably, the measurements of perception, comprehension, and preference, employ validated experimental designs and data collection techniques as may be known in the respective art.

As will be apparent from the foregoing description, the text to be spoken can be marked with one, more than one or all of the prosodic graphical symbols selected from the group consisting of: graphical symbols indicating pitch control required for pronunciation of a letter, diphthong, syllable or other speech element according to a desired prosody; an upglide to indicate rising pitch; a downglide to indicate descending pitch; a circumflex to indicate a rising then descending pitch or a descending then rising pitch; a level sustention to indicate unchanged pitch; a forward slash through a first letter followed by a closely related or identical sounding consonant to indicate that the first letter is prepared; a shallow U-shaped liaison hammock to indicate that letters separated from each other by other letters are to be pronounced in a continuous manner, without pause between them; a single underline to mark as playable percussives including tympani drumbeats, D, B and G and snare, bass and tom-tom drumbeats, T, P and K, respectively, unmarked consonants being not playable; a double underline to mark as playable strings N, M, V and Z woodwinds, L, NG, TH and ZH and (voiceless) sound effects F, S, SH and th, unmarked consonants being not playable; the letter combination "hw" marked over or adjacent to the letter combination WH in the text to be spoken to indicate that the H should be sounded first, followed by the W, and that neither should be played; and Y and W connectives to indicate that speech continuity should be maintained from one word to the next or from one syllable to the next when a [Y] or a [W] occurs before another vowel, the Y and W connectives each comprising a hammock-like shallow-U looping from beneath the Y or the W respectively to the following vowel, together with a small Y or W letter respectively marked in, near or through the U; wherein consonants before a vowel are ruled as to be spoken but are not marked as playable.

Alternatively, or in addition, the text to be spoken can be marked with one, more than one or all of the prosodic graphical symbols selected from the group consisting of: a direct link, comprising a liaison hammock strung beneath and between the linked letters to indicate that the spoken momentum should be carried from one linked letter to the next without interruption or a pause or break between words; a play-and-link comprising a liaison hammock combined with single or double underlining of the first consonant to indicate that the first consonant is played and the second consonant is not; and a prepare-and-link comprising a forward slash through a first consonant being a consonant to be prepared, combined with a liaison hammock to a second consonant to show the linkage between the first and second consonants, playable consonants being indicated with underlining.

Several possible embodiments of markup instructions that can be employed in the invention, and if desired, may be included in a prosodic acoustic library database, are described herein. Pursuant to the invention it is to be understood that the novel acoustic value code, or graphical symbol set and notations, described herein are merely illustrative of codes that may be employed or devised to serve the purposes of the present invention as are apparent from the disclosure herein.

Furthermore, while the exemplary acoustic value codes are described in the context of the English language it will be understood that the invention embraces other coding systems devised for the particular needs of other languages which embody the general principles herein regarding pronunciation markups for consistency with speech rules, suitably modified, or adapted as necessary for another language. Thus, the methods of the invention can for example be implemented in a language selected from the group consisting of English; American English; French; Spanish; German; Japanese; Russian; Chinese; Arabic; Hindi; a written and spoken language having a graphic symbol set and a rules-based grammar; and dialects and specialist subsets of any one of the foregoing languages or other language, subsets or dialects as will be apparent to those skilled in the art in light of the teachings herein.

It will be understood that the Lessac or other speech training rules are particularly effective for pronunciation for intelligibility of relatively smaller speech elements comprising individual letters and two- or three-letter combinations while the prosody rules described herein are useful for applying play, pauses, stress and other prosodic techniques to such letters or letter combinations usually in the context of larger speech elements comprising whole words, phrases, sentences or paragraphs.

In summary, the invention provides a graphically representable global rules set comprising pronunciation rules for intelligibility and prosodic rules for rhythm and melody, that when applied by a skilled speech practitioner to text to be spoken, either by human or machine, can provide an unambiguous template for clear, appealing, even melodic speech output.

Disclosures Incorporated. The entire disclosure of each and every United States patent and patent application, each foreign and international patent publication, of each other publication and of each unpublished patent application that is referenced in this specification or elsewhere in this patent application, is hereby incorporated herein, in its entirety, by the respective specific reference that has been made thereto.

While illustrative embodiments of the invention have been described above, it is, of course, understood that many and various modifications will be apparent to those of ordinary skill in the relevant art, or may become apparent as the art develops. Such modifications are contemplated as being within the spirit and scope of the invention or inventions disclosed in this specification.

The invention claimed is:

1. A computer-implemented method of synthesizing speech from text, the method comprising:
   inputting text to be synthesized to a computerized system;
   electronically marking the text with electronic versions of one or more prosodic graphical symbols, the electronically marked text being displayable or printable as human-readable text marked with the prosodic graphical symbols, to indicate to a speaker desired speech characteristics to be employed in speaking the text, wherein the prosodic graphical symbols indicate a desired prosody and include intelligibility pronunciation notations in sequence with the text and pitch change notations in sequence with the text; and
   generating a synthesized speech output comprising phonetic data corresponding with the marked up text and having the prosody indicated by the prosodic graphical symbols.

2. A method according to claim 1 wherein the prosody comprises one or more prosody elements selected from the group consisting of pace, intonation pattern, rhythm, musicality, amplitude, pauses for emphasis and breath, and formal and informal articulations of words and phrases.

3. A method according to claim 2 comprising marking the text to be spoken with one, more than one or all of the prosodic graphical symbols selected from the group consisting of:
   graphical symbols indicating pitch control required for pronunciation of a letter, diphthong, syllable or other speech element according to a desired prosody; an upglide to indicate rising pitch;
   a downglide to indicate descending pitch;
   a circumflex to indicate a rising then descending pitch or a descending then rising pitch;
   a level sustention to indicate unchanged pitch; a forward slash through a first letter followed by a closely related or identical sounding consonant to indicate that the first letter is prepared;
   a shallow U-shaped liaison hammock to indicate that letters separated from each other by other letters are to be pronounced in a continuous manner, without pause between them;
   a single underline to mark as playable percussives including tympani drumbeats, D, B and G and snare, bass and tom-tom drumbeats, T, P and K, respectively, unmarked consonants being not playable;
   a double underline to mark as playable strings N, M, V and Z woodwinds, L, NG, TH and ZH and sound effects F, S, SH and th, unmarked consonants being not playable;
   the letter combination "hw" marked over or adjacent to the letter combination WH in the text to be spoken to indicate that the H should be sounded first, followed by the W, and that neither should be played; and
   Y and W connectives to indicate that speech continuity should be maintained from one word to the next or from one syllable to the next when a [Y] or a [W] occurs before another vowel, the Y and W connectives each comprising a hammock-like shallow-U looping from beneath the Y or the W respectively to the following vowel, together with a small Y or W letter respectively marked in, near or through the U;
   wherein consonants before a vowel are ruled as to be spoken but are not marked as playable.

4. A method according to claim 2 comprising marking up the text to be spoken with one, more than one or all of the prosodic graphical symbols selected from the group consisting of:
   a direct link, comprising a liaison hammock strung beneath and between the linked letters to indicate that the spoken momentum should be carried from one linked letter to the next without interruption or a pause or break between words;
   a play-and-link comprising a liaison hammock combined with single or double underlining of the first consonant to indicate that the first consonant is played and the second consonant is not; and
   a prepare-and-link comprising a forward slash through a first consonant being a consonant to be prepared, combined with a liaison hammock to a second consonant to show the linkage between the first and second consonants, playable consonants being indicated with underlining;
   wherein the method is implemented in a language selected from the group consisting of English; American English; French; Spanish; German; Japanese; Russian; Chinese; Arabic; Hindi; a written and spoken language having a graphic symbol set and a rules-based grammar; and a dialect or a specialist subset of any one of the foregoing languages.

5. A method according to claim 4 employing an acoustic library comprising digitally recorded speech elements, being speech elements having been spoken with the prosody indicated by the graphic symbol markings, the method comprising utilizing the prosodic graphical symbols to promote generation of a humanized sound in synthesized speech output, the speech output optionally being formant speech, and comprising one or more, trained persons accurately pronouncing text according to the mark-up of the text with the prosodic graphical symbols to produce databases of pronounced speech containing pronounced speech accurately following the speech-code-marked text, digitally rendering the prosodic graphical symbols and employing the digitally rendered graphical symbols in synthesizer software for electronic markup of text to be machine spoken to facilitate the introduction into the digital domain of prosodic elements intended to be present the output speech.

6. A method according to claim 1 comprising marking the text to be spoken with one, more than one or all of the prosodic graphical symbols selected from the group consisting of:
  graphical symbols indicating pitch control required for pronunciation of a letter, diphthong, syllable or other speech element according to a desired prosody; an upglide to indicate rising pitch;
  a downglide to indicate descending pitch;
  a circumflex to indicate a rising then descending pitch or a descending then rising pitch;
  a level sustention to indicate unchanged pitch; a forward slash through a first letter followed by a closely related or identical sounding consonant to indicate that the first letter is prepared;
  a shallow U-shaped liaison hammock to indicate that letters separated from each other by other letters are to be pronounced in a continuous manner, without pause between them;
  a single underline to mark as playable percussives including tympani drumbeats, D, B and G and snare, bass and tom-tom drumbeats, T, P and K, respectively, unmarked consonants being not playable;
  a double underline to mark as playable strings N, M, V and Z woodwinds, L, NG, TH and ZH and sound effects F, S, SH and th, unmarked consonants being not playable;
  the letter combination "hw" marked over or adjacent to the letter combination WH in the text to be spoken to indicate that the H should be sounded first, followed by the W, and that neither should be played; and
  Y and W connectives to indicate that speech continuity should be maintained from one word to the next or from one syllable to the next when a [Y] or a [W] occurs before another vowel, the Y and W connectives each comprising a hammock-like shallow-U looping from beneath the Y or the W respectively to the following vowel, together with a small Y or W letter respectively marked in, near or through the U;
  wherein consonants before a vowel are ruled as to be spoken but are not marked as playable.

7. A method according to claim 1 comprising marking up the text to be spoken with one, more than one or all of the prosodic graphical symbols selected from the group consisting of:
  a direct link, comprising a liaison hammock strung beneath and between the linked letters to indicate that the spoken momentum should be carried from one linked letter to the next without interruption or a pause or break between words;
  a play-and-link comprising a liaison hammock combined with single or double underlining of the first consonant to indicate that the first consonant is played and the second consonant is not; and
  a prepare-and-link comprising a forward slash through a first consonant being a consonant to be prepared, combined with a liaison hammock to a second consonant to show the linkage between the first and second consonants, playable consonants being indicated with underlining.

8. A method according to claim 1 comprising placing the prosodic graphical symbols adjacent to the text to be spoken, coordinating the prosodic graphical symbols in a row directly above the text, placing the prosodic graphical symbols selectively beneath the text or placing the prosodic graphical symbols both above the text and beneath the text.

9. A method according to claim 1 comprising marking up the text to be spoken by rendering the text in lines, marking the intelligibility pronunciation notations above the text, marking the prosodic graphical symbols beneath the text, marking a pitch reference line above the intelligibility pronunciation notation line and marking further prosodic symbols above the pitch reference line to indicate desired pitch changes and emphasis.

10. A method according to claim 9 wherein the pitch reference line comprises a Y-buzz pitch line and the method further comprises marking a desired intonation pattern above the Y-buzz pitch line using smaller dots to indicate less stress and larger dots to indicate more stress, the dots being positioned at levels above the Y-buzz pitch line to be indicative of the desired pitch relative to the speaker's Y-buzz pitch line.

11. A method according to claim 1, for automated application of prosodic markings to text, the method comprising employing at least one computational linguistics algorithm to identify and mark the text to be pronounced to indicate desired prosodic pronunciation.

12. A method according to claim 11 comprising employing code variables corresponding with desired pronunciation sounds to generate values for acoustic variables employable to specify inputs to a speech synthesizer for outputting the marked-up text as synthesized speech.

13. A method according to claim 1 employing an acoustic library comprising digitally recorded speech elements, being speech elements having been spoken with the prosody indicated by the graphic symbol markings.

14. A method according to claim 13 implemented in a language selected from the group consisting of English; American English; French; Spanish; German; Japanese; Russian; Chinese; Arabic; Hindi; a written and spoken language having a graphic symbol set and a rules-based grammar; and a dialect or a specialist subset of any one of the foregoing languages.

15. A method according to claim 1 comprising utilizing the prosodic graphical symbols to promote generation of a humanized sound in synthesized speech output, and comprising one or more, trained persons accurately pronouncing text according to the mark-up of the text with the prosodic graphical symbols to produce databases of pronounced speech containing pronounced speech accurately following the speech-code-marked text.

16. A method according to claim 15 comprising digitally rendering the prosodic graphical symbols and employing the digitally rendered graphical symbols in synthesizer software for electronic markup of text to be machine spoken to facilitate the introduction into the digital domain of prosodic elements intended to be present the output speech.

17. A method according to claim 16 wherein recorded speech corresponding to the graphical notations for text comprising one or more of letters, words, phrases, sentences, paragraphs and longer texts is digitized into databases and analyzed to provide algorithms or metrics to specify the relationship of specific phonetic data corresponding to specific text and the graphical notations related to the text.

18. A method according to claim 17 comprising utilizing one or more of the provided algorithms or metrics to provide input parameters to a speech synthesizer to re-create sounds that imitate human speech for a particular text to be synthesized as speech with a specified prosody.

19. A method according to claim 1 wherein the pitch change notations include a pitch reference, relative pitch notations and stress notations for the relative pitch notations.

20. A computerized speech synthesizer for synthesizing speech from text comprising a data processing unit, data memory, and a text input for inputting text to be synthesized to the speech synthesizer, and a speech synthesis program for:

electronically marking text input to the speech synthesizer with electronic versions of one or more prosodic graphical symbols, the electronically marked text being displayable or printable as human-readable text marked with the prosodic graphical symbols, to indicate to a speaker a desired speech characteristics to be employed in speaking the text, wherein the prosodic graphical symbols indicate a desired prosody and include intelligibility pronunciation notations in sequence with the text and pitch change notations in sequence with the text; and generating a synthesized speech output comprising phonetic data corresponding with the marked up text and having the prosody indicated by the prosodic graphical symbols.

* * * * *